US009626161B2

(12) United States Patent
Elliman

(10) Patent No.: US 9,626,161 B2
(45) Date of Patent: Apr. 18, 2017

(54) COMPUTER READABLE MEDIUM AND METHODS FOR FILTERING A DYNAMIC COMPARISON MODEL

(75) Inventor: David S. Elliman, Newtown, PA (US)

(73) Assignee: CA, Inc., New York, NY (US)

(*) Notice: Subject to any disclaimer, the term of this patent is extended or adjusted under 35 U.S.C. 154(b) by 2080 days.

(21) Appl. No.: 11/609,765

(22) Filed: Dec. 12, 2006

(65) Prior Publication Data
US 2008/0141215 A1   Jun. 12, 2008

(51) Int. Cl.
G06F 9/44      (2006.01)

(52) U.S. Cl.
CPC ............ G06F 8/34 (2013.01); G06F 8/20 (2013.01); G06F 9/4443 (2013.01)

(58) Field of Classification Search
CPC ............. G06F 8/34; G06F 8/38; G06F 8/33
See application file for complete search history.

(56) References Cited

U.S. PATENT DOCUMENTS

| | | | |
|---|---|---|---|
| 5,550,971 A * | 8/1996 | Brunner et al. | |
| 5,799,193 A * | 8/1998 | Sherman et al. | 717/105 |
| 5,815,717 A * | 9/1998 | Stack | G06F 8/33 717/105 |
| 6,038,393 A * | 3/2000 | Iyengar et al. | 717/104 |
| 6,182,274 B1 * | 1/2001 | Lau | 717/104 |
| 6,385,610 B1 * | 5/2002 | Deffler et al. | |
| 6,601,023 B1 * | 7/2003 | Deffler et al. | 703/13 |
| 6,738,727 B2 * | 5/2004 | Chang | 702/167 |
| 6,757,889 B1 * | 6/2004 | Ito | 717/112 |
| 6,859,919 B1 * | 2/2005 | Deffler et al. | 717/100 |
| 7,058,924 B2 * | 6/2006 | Greenstein | 717/100 |
| 7,412,655 B2 * | 8/2008 | Wada et al. | 715/744 |
| 7,444,310 B2 * | 10/2008 | Meng et al. | 706/15 |
| 7,562,351 B2 * | 7/2009 | Haas et al. | 717/127 |
| 7,734,457 B2 * | 6/2010 | Deffler | 703/13 |
| 7,735,062 B2 * | 6/2010 | de Seabra e Melo | G06F 8/71 707/616 |
| 7,752,024 B2 * | 7/2010 | Ball et al. | 703/13 |
| 7,958,486 B2 * | 6/2011 | Tsyganskiy et al. | 717/105 |
| 7,987,445 B2 * | 7/2011 | Fuller, III | G06F 8/34 345/630 |
| 8,122,354 B1 * | 2/2012 | Torgerson | G06F 3/04895 715/710 |
| 8,522,196 B1 * | 8/2013 | Kim | G06F 11/3664 717/100 |

(Continued)

OTHER PUBLICATIONS

AllFusion ERwin Data Modeler Getting Started, published by Computer Associates, 2002, pp. 1-86.*

(Continued)

*Primary Examiner* — Tuan Q. Dam
*Assistant Examiner* — Zheng Wei
(74) *Attorney, Agent, or Firm* — Baker Botts L.L.P.

(57) ABSTRACT

A method for filtering a dynamic comparison model includes the steps of determining a plurality of differences between a first model and a second model, and displaying each of the plurality of differences between the first model and the second model to a user via a display. The method also includes the steps of receiving a user-selected one of the plurality of differences between the first model and the second model, and removing the user-selected one of the plurality of differences between the first model and the second model from the display.

14 Claims, 3 Drawing Sheets

(56) References Cited

U.S. PATENT DOCUMENTS

| | | | |
|---|---|---|---|
| 8,782,542 B2* | 7/2014 | Erl | 715/764 |
| 8,850,384 B2* | 9/2014 | Erl | 717/104 |
| 2001/0018326 A1* | 8/2001 | Link, II | 455/3.05 |
| 2002/0149625 A1* | 10/2002 | Shimizu | G06T 19/00 715/771 |
| 2003/0154462 A1* | 8/2003 | Kumagai | 717/120 |
| 2003/0195755 A1* | 10/2003 | Greenstein et al. | 705/1 |
| 2003/0195756 A1* | 10/2003 | Greenstein et al. | 705/1 |
| 2003/0212984 A1* | 11/2003 | Miyazaki et al. | 717/116 |
| 2004/0031015 A1* | 2/2004 | Ben-Romdhane et al. | 717/107 |
| 2004/0103393 A1* | 5/2004 | Reddy et al. | 717/122 |
| 2004/0107414 A1* | 6/2004 | Bronicki | G06F 8/34 717/105 |
| 2004/0111702 A1* | 6/2004 | Chan | G06F 8/34 717/113 |
| 2005/0114831 A1* | 5/2005 | Callegari et al. | 717/104 |
| 2005/0160401 A1* | 7/2005 | Russo et al. | 717/108 |
| 2006/0026522 A1* | 2/2006 | Bendsen | G06F 8/34 715/705 |
| 2006/0059461 A1* | 3/2006 | Baker | G06F 8/34 717/113 |
| 2006/0168558 A1* | 7/2006 | de Seabra e Melo | G06F 8/71 717/105 |
| 2006/0225030 A1* | 10/2006 | Deffler | 717/104 |
| 2006/0282458 A1* | 12/2006 | Tsyganskiy et al. | 707/102 |
| 2006/0293940 A1* | 12/2006 | Tsyganskiy et al. | 705/8 |
| 2007/0006130 A1* | 1/2007 | Stamler et al. | 717/104 |
| 2007/0083852 A1* | 4/2007 | Watanabe | 717/114 |
| 2007/0162486 A1* | 7/2007 | Brueggemann et al. | 707/102 |
| 2008/0028003 A1* | 1/2008 | Brueggemann | 707/202 |
| 2008/0028365 A1* | 1/2008 | Erl | 717/105 |
| 2008/0046864 A1* | 2/2008 | Bai et al. | 717/105 |
| 2008/0120593 A1* | 5/2008 | Keren | G06F 9/4443 717/105 |
| 2008/0250386 A1* | 10/2008 | Erl | 717/100 |
| 2008/0263469 A1* | 10/2008 | Nasle | G06F 8/38 715/771 |
| 2011/0078652 A1* | 3/2011 | Mani | G06F 8/10 717/105 |

OTHER PUBLICATIONS

AllFusion ERwin Data Modeler Method Guide r7, published by Computer Associates, 2006, pp. 1-104.*

AllFusion ERwin Data Modeler Getting Started r7, published by Computer Associates, 2006, pp. 1-224.*

* cited by examiner

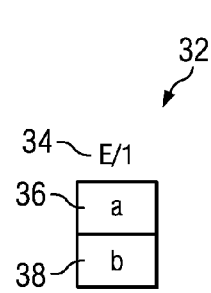 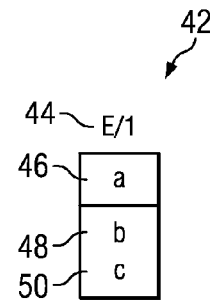
FIG. 1A  FIG. 1B
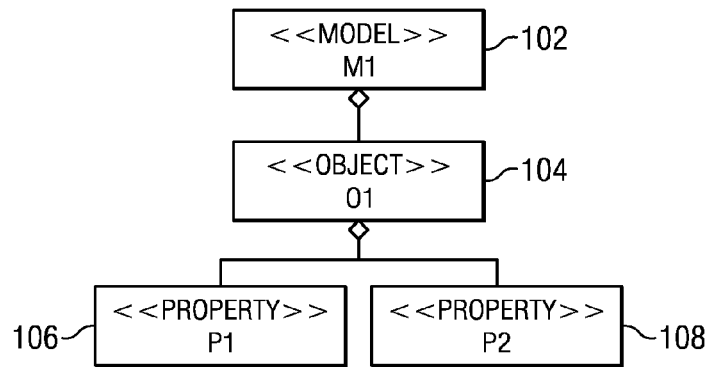
FIG. 2A
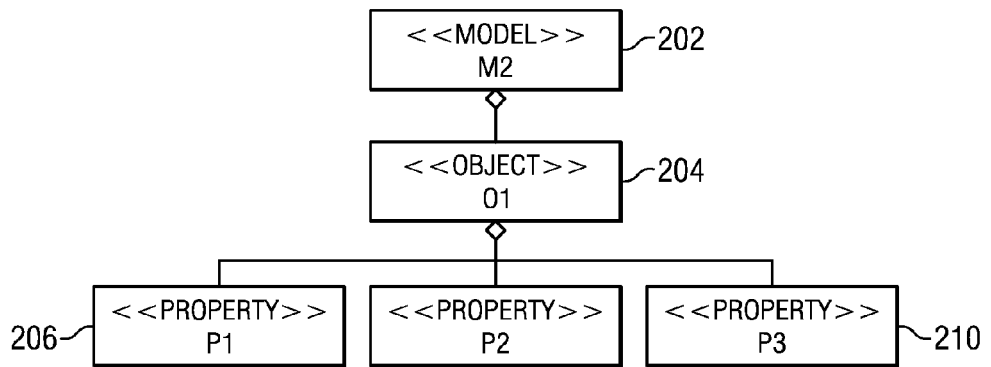
FIG. 2B

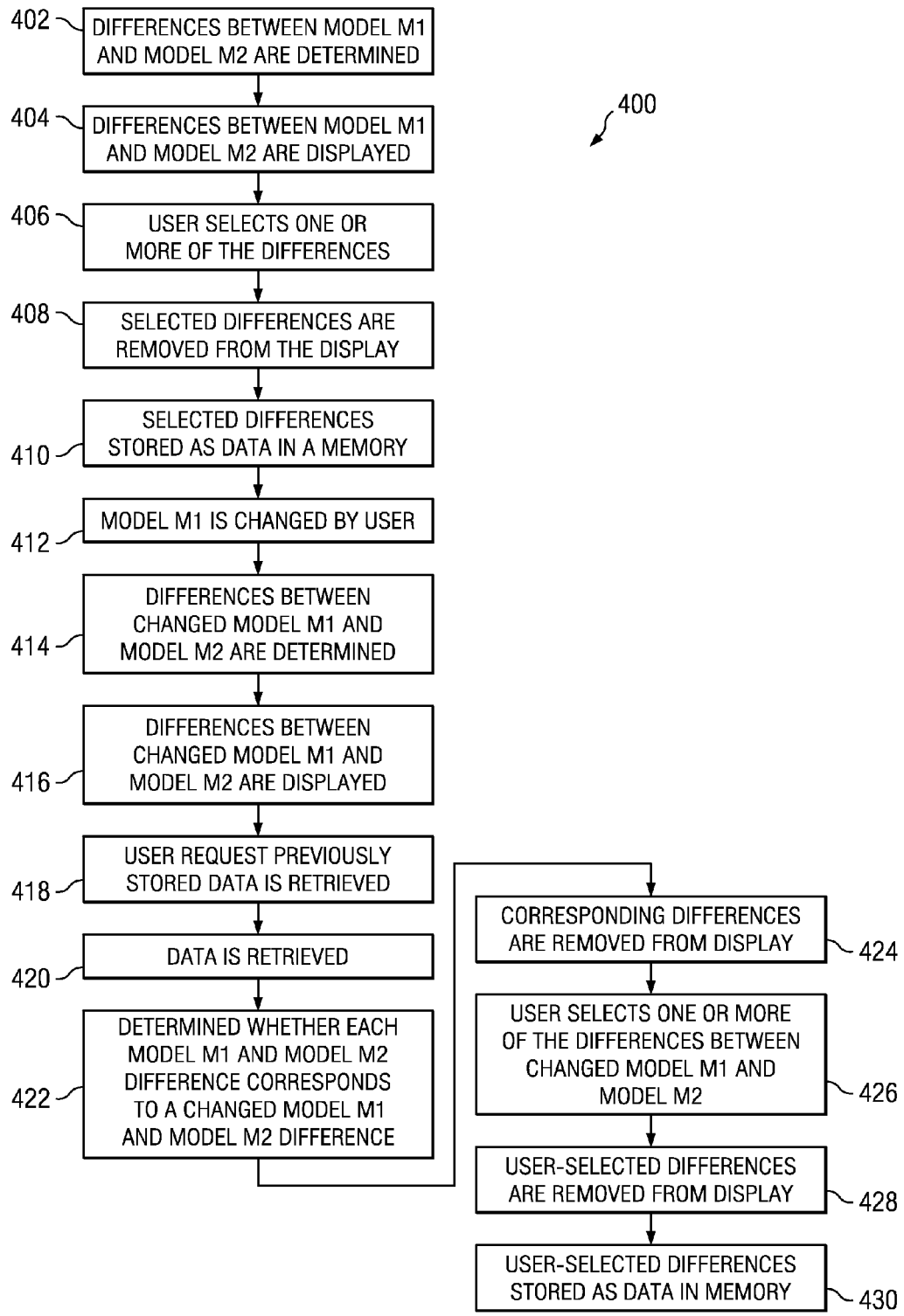

COMPUTER READABLE MEDIUM AND METHODS FOR FILTERING A DYNAMIC COMPARISON MODEL

TECHNICAL FIELD OF THE INVENTION

The present invention relates generally to computer-readable medium and methods for filtering a dynamic comparison model.

BACKGROUND OF THE INVENTION

Models may be used to help visualize concepts by using symbolic representations. Models may include a group of objects, entities, properties, attributes, or the like. For example, a model may be used to represent a database and the attributes and properties associated with the database. In operation, it may be desirable to compare two models to determine the differences between the models in order to better understand similarities and differences between the models. For example, such a comparison may be helpful to synchronize or bring some level of conformity to the models. By comparing two models and identifying any differences between them, a user more readily may make desired changes to one of both of the models to achieve the desired level of conformity. Existing tools, e.g., software programs, are available that compare different models and identify the differences between the models. Nevertheless, because there may be substantial differences between the models, presentation of all of the differences between the models may overwhelm a user of the software program, and may make it difficult for the user to sift through all of the differences to determine which differences the user considers to be most important.

SUMMARY OF THE INVENTION

Therefore, a need has arisen for systems and methods for filtering a dynamic comparison model that overcome these and other shortcomings of the related art. A technical advantage of the present invention is that a user initially may be presented with all of the differences between two models, but subsequently may select any of the differences and mark the selected differences as "known differences." The differences which the user designates as known differences may be hidden from the user and saved as data in a memory, such that the presentation of the differences between the models becomes less cluttered to the user, and the user is able to more readily focus on the remaining differences. Moreover, over the course of time, one or both of the models may change. When the user runs the comparison again, all of the differences initially may be presented to the user. The user then may load the previously saved data associated with the comparison between the two models, and to the extent that the differences which the user previously indicated were known differences did not change, the differences which the user previously indicated were known differences may be hidden from the user. Consequently, the user does not have to review all of the differences again to determine which differences the user wishes to mark as known differences, which saves the user time. Nevertheless, if the one or more of the differences which the user previously indicated were known differences changed, those differences may not be filtered out when the user loads the previously saved data. For example, it may be desirable to present the change(s) in the previously known difference to the user, such that the user may determine whether in view of the change(s) the user still wishes to mark the difference as a known difference.

According to an embodiment of the present invention, a method for filtering a dynamic comparison model comprises the steps of determining a plurality of differences between a first model and a second model, and displaying each of the plurality of differences between the first model and the second model to a user via a display. The method also comprises the steps of receiving at least one, user-selected difference from the plurality of differences between the first model and the second model, and removing the at least one, user-selected difference from the plurality of differences between the first model and the second model from the display.

According to another embodiment of the present invention, a computer-readable medium has computer-readable instructions stored thereon for execution by a processor to perform a method for filtering a dynamic comparison model comprising determining a plurality of differences between a first model and a second model, and displaying each of the plurality of differences between the first model and the second model to a user via a display. The method also comprises the steps of receiving at least one, user-selected difference from the plurality of differences between the first model and the second model, and removing the at least one, user-selected difference from the plurality of differences between the first model and the second model from the display.

Other objects, features, and advantages of the present invention will be apparent to persons of ordinary skill in the art in view of the foregoing detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIG. 1A is an exemplary standard Entity Relationship model, according to an embodiment of the present invention.

FIG. 1B is an exemplary standard Entity Relationship model, according to an embodiment of the present invention.

FIG. 2A is an exemplary standard object/property model, according to an embodiment of the present invention.

FIG. 2B is an exemplary standard object/property model, according to an embodiment of the present invention.

FIG. 4 is a flow chart of a method for filtering a dynamic comparison model, according to an embodiment of the present invention.

DETAILED DESCRIPTION OF THE INVENTION

Figure 3:
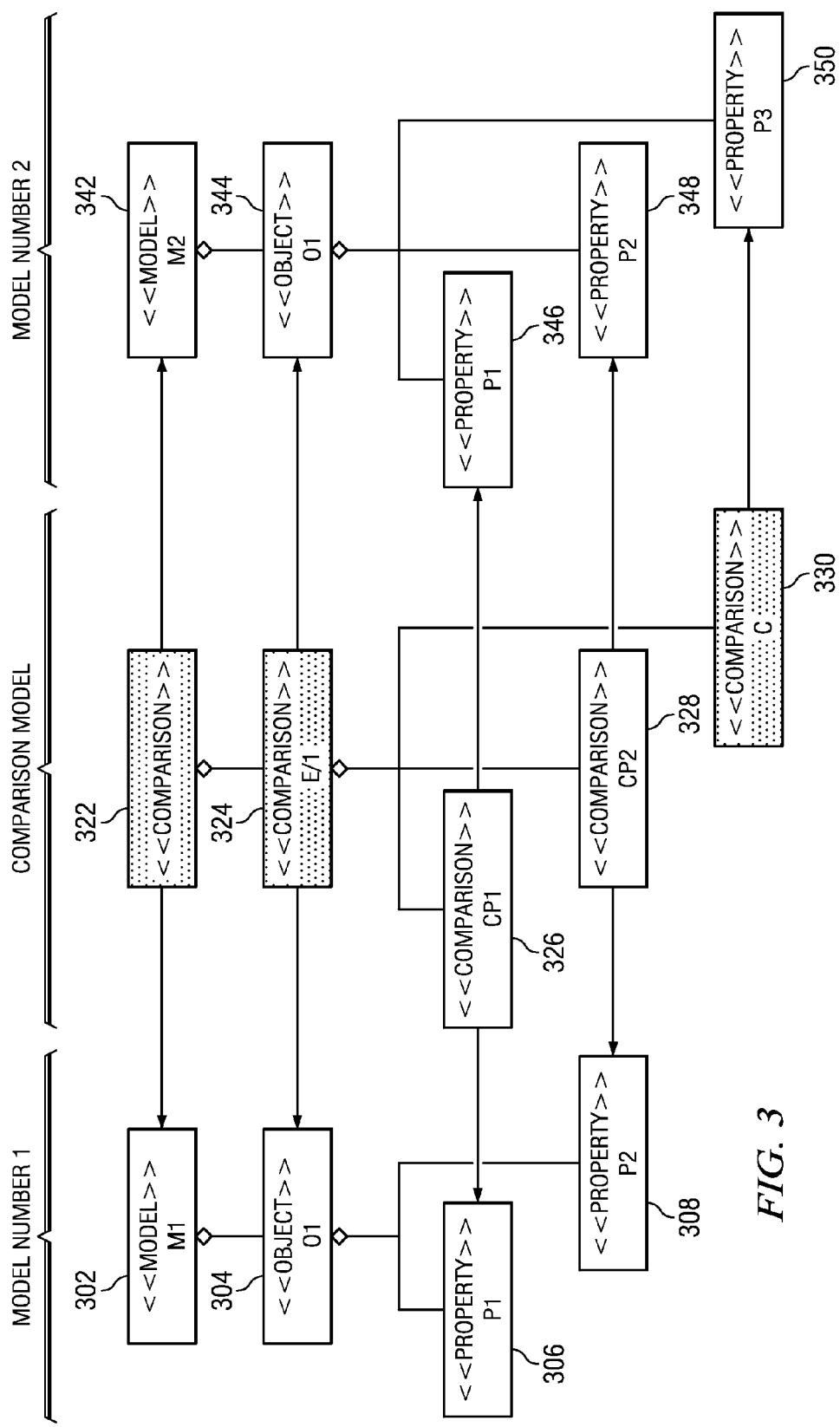
FIG. 3 is an exemplary object model with a comparison model between two standard models, according to an embodiment of the present invention.

Preferred embodiments of the present invention, and their features and advantages, may be understood by referring to FIGS. 1A-4, like numerals being used for corresponding parts in the various drawings.

A model is a representation that may be used to help illustrate a concept using symbolic representations. It may be beneficial to compare two models to better understand the similarities and the differences between the two models. For example, such a comparison may be helpful to synchronize or bring some level of conformity to the models. By comparing two models and identifying the differences between them, a user more readily may make desired changes to one or both of the models to achieve a desired level of conformity.

Models may be represented using various hierarchical components. For example, a model may include one or more entities or one or more objects. Each entity may include one or more attributes, and each object may include one or more properties. Various types of models may be used to illustrate concepts using visual representations. For example, an object model may include any physical or logical description of data that is to be defined, processed, or retrieved by implemented code. An object model generally represents categories of data. Based on the hierarchical structure of models, objects may own or be owned by other objects. An object owns another object when the objects are in a hierarchical relationship and the owning object is at a higher level than the owned object. Each entity may include one or more attributes, and each object may include one or more properties that are relevant to the model.

In accordance with an embodiment of the present invention, a process of comparing two models results in a collection of comparison nodes that hold information about the comparison. For example, the attributes of one model may be compared to the attributes of a second model, and the comparison may be stored as a collection of comparison nodes. In this manner, the results of the comparison may be reviewed and/or the models may be brought into some higher level of conformity with one another, as desired by a user.

In accordance with an embodiment of the present invention, comparison nodes may be represented as an object/property model using an underlying modeling engine. One such modeling engine is CA, Inc.'s AllFusion™ ERwin™ Data Modeler modeling engine. Models within an object/property model may be referred to as graphs. Modeling a comparison model or comparison graph allows for representing similar and dissimilar aspects of the compared models.

In accordance with an embodiment of the present invention, models may be represented in IDEF1x format. IDEF1x is a standard for diagramming schemas that will be familiar to those of ordinary skill in the art. Reference materials may be found at http://www.idef.com. FIGS. 1A and 1B illustrate exemplary schemas in IDEF1x notation. In an IDEF1x model, entities and attributes are types of objects. FIG. 1A shows a schema representation of Model M1 from FIG. 2A. Model M1 32 includes a single Entity, E/1 34. Entity E/1 34 includes two Attributes, a 36 and b 38. FIG. 1B shows a schema representation of Model M2 from FIG. 2B. Model M2 42 includes a single Entity, E/1 44. Entity E/1 44 includes three Attributes, a 46, b 48, and c 50. In another embodiment, models may be in XML, flat, or comma-separated format. In order to bring the models of FIGS. 1A and 1B into conformity, a user may create attribute "C" in the Model of FIG. 1A, or delete attribute "C" from the Model of FIG. 1B.

FIGS. 2A and 2B are simplified object/property models of actual data that may be found in ERwin. FIG. 2A shows a first Model, M1 102. Model M1 102 includes a single Object, O1 104. Object O1 104 includes two Properties, P1 106 and P2 108. FIG. 2B shows a second Model, M2 202. Model M2 202 includes a single Object, O1 204. Object O1 204 includes three Properties, P1 206, P2 208, and P3 210. As shown in FIG. 2B, Model M2 202 in FIG. 2 differs from Model M1 102 in FIG. 2A by the third Property P3 210. Similar approaches may be used when an object belongs to one model, but does not belong to another model.

FIG. 3 shows a Comparison Model, CM 322, which contains objects indicating the comparison state between models, objects, and properties. The hierarchy of the objects in Comparison Model CM 322 matches the hierarchy of Models M1 302 and M2 342. The objects in Comparison Model CM 322 hold references to the two models. As shown in FIG. 3, Comparison Model CM 322 contains the comparison state between Models M1 302 and M2 342. Object CO1 324 contains the comparison state for Objects O1 304 and O1 344. Similarly, the Comparison Model CM 322 contains the comparison state for each of the properties in Models M1 302 and M2 342. For illustrative purposes, FIG. 3 shows cross-hatched comparison objects with a comparison state set to "Not Equal."

Patent Application Publication No. US 2006/0225030 A1, which is entitled "Method and System for Generating Dynamic Comparison Models," the disclosure of which is incorporated herein by reference in its entirety, describes a method for generating a dynamic comparison model which indicates the differences between Model M1 and Model M2. The known method of generating a dynamic comparison model described in Patent Application Publication No. US 2006/0225030 A1 is substantially the same as the method of generating a dynamic comparison model in the present invention. Therefore, a discussion of the method of generating a dynamic comparison model is omitted from this application.

According to an embodiment of the present invention, after the dynamic comparison model is generated, the dynamic comparison model may be filtered. Referring to FIG. 4, a method 400 for filtering a dynamic comparison model is depicted. In step 402, a plurality of differences between Model M1 and Model M2 may be determined, and in step 404, each of the plurality of differences between Model M1 and Model M2 may be displayed to a user via a display. For example, the differences between Model M1 and Model M2 may be determined and displayed in accordance with any of the methods described in Patent Application Publication No. US 2006/0225030 A1. Moreover, those of ordinary skill in the art readily will understand that a display may comprise any means by which a user may view an image, such as a monitor, a screen, a wall receiving a projected image, a hologram, or the like. In step 406, a user selects one or more of the differences between Model M1 and Model M2, and in step 408, the user-selected difference(s) are removed from the display, such that the user-selected differences are hidden from the user. For example, because there may be substantial differences between Model M1 and Model M2, presentation of all of the differences between Model M1 and Model M2 may overwhelm the user, and may make it difficult for the user to sift through all of the differences to determine which differences the user considers to be most important. By allowing the user to filter out some of the differences, such that the filtered differences are hidden from the user, the presentation of the differences between Model M1 and Model M2 becomes less cluttered to the user, and the user is able to more readily focus on the remaining differences. In addition, the user may de-select a previously selected difference, such that the previously hidden difference again becomes viewable to the user. In step 410, each of the user-selected differences are saved as data in a memory, e.g., when the user selects the option to save the user-selected differences.

Over the course of time, one or both of Model M1 and Model M2 may change, and the user subsequently may wish to compare a changed Model M1 with Model M2, Model M1 with a changed Model M2, and/or the changed Model M1 with the changed Model M2. Therefore, in step 412, the user changes Model M1, and original Model M1 is updated to reflect such changes. Although in this example Model M1 is changed, those of ordinary skill in the art readily will understand that either of Model M1 and Model M2, or both, may be changed by the user. In step 414, a plurality of differences between changed Model M1 and Model M2 may be determined, and in step 416, each of the plurality of differences between changed Model M1 and Model M2 may be displayed to the user via the display. At this time, there may be substantial differences between changed Model M1 and Model M2, presentation of all of the differences between changed Model M1 and Model M2 may overwhelm the user, and may make it difficult for the user to sift through all of the differences to determine which differences the user considers to be most important. Nevertheless, in step 406 the user selected one or more of the differences between Model M1 and Model M2, and step 410 those differences were saved as data in the memory. Therefore, in step 418 the user may request that the previously saved data be retrieved, and in step 420 the data is retrieved.

In step 422, for each of the differences which were saved in step 410, it is determined whether the saved difference between Model M1 and Model M2 corresponds to one of the plurality of differences between changed Model M1 and Model M2. If the saved difference between Model M1 and Model M2 corresponds to one of the plurality of differences between changed Model M1 and Model M2, then in step 424, the difference is removed from the display. Specifically, if the user previously marked the difference as a known difference, then there is no need to continue to display the difference to the user and the difference may be removed from the display, which saves the user from having to go back and re-select all of the differences which the user selected when the user compared Model M1 with Model M2. Nevertheless, if in step 422 the saved difference between Model M1 and Model M2 does not correspond to one of the plurality of differences between changed Model M1 and Model M2, then the difference is not removed from the display. Specifically, if the saved difference between Model M1 and Model M2 changed when Model M1 changed, it may be desirable to show the user the change because otherwise the user will not know about the change.

After the appropriate differences between changed Model M1 and Model M2 are removed from the display in step 424, in step 426 the user selects one or more of the differences between changed Model M1 and Model M2, and in step 428, the user-selected difference(s) are removed from the display, such that the user-selected differences are hidden from the user. Moreover, in step 430, each of the user-selected differences are saved as data in the memory, e.g., when the user selects the option to save the user-selected differences. This process may continue for any number of changes to Model M1 or Model M2, or both.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A method for filtering a dynamic comparison model, comprising the steps of:
    generating a first comparison model including a plurality of differences between a first model and a second model;
    displaying the first comparison model with each of the plurality of differences between the first model and the second model to a user via a display;
    allowing the user to select at least one difference between the first model and the second model from the displayed plurality of differences between the first model and the second model;
    receiving at least one, user-selected difference between the first model and the second model from the user; and
    in response to receiving at least one, user-selected difference between the first model and the second model from the user, and without changing the first model and the second model, removing from the display the at least one, user-selected difference between the first model and the second model from the displayed plurality of differences between the first model and the second model.

2. The method of claim 1, further comprising the step of saving the at least one, user-selected difference between the first model and the second model in a memory.

3. The method of claim 2, further comprising the steps of:
    receiving at least one, user-designated change to the first model;
    updating the first model based on the at least one, user-designated change to generate a changed first model;
    generating a second comparison model including a plurality of differences between the changed first model and the second model;
    displaying the second comparison model with each of the plurality of differences between the changed first model and the second model to the user via the display;
    receiving a user-request to retrieve the at least one, user-selected difference between the first model and the second model from the memory;
    retrieving the at least one, user-selected difference between the first model and the second model from the memory;
    determining the one or more differences of the plurality of differences between the changed first model and the second model that correspond to one or more differences of the at least one, user-selected difference between the first model and the second model; and
    in response to determining the one or more differences of the plurality of differences between the changed first model and the second model that correspond to one or more differences of the at least one, user-selected difference between the first model and the second model, and without requiring the user to reselect any of the displayed differences between the first model and the second model, removing from the display each of the one or more differences of the plurality of differences between the changed first model and the second model that correspond to one or more differences of the at least one, user-selected difference between the first model and the second model.

4. The method of claim 3, further comprising the steps of:
receiving at least one, user-selected difference from the plurality of differences between the changed first model and the second model;
removing from the display the at least one, user-selected difference between the changed first model and the second model; and
saving the at least one, user-selected difference between the changed first model and the second model in the memory.

5. The method of claim 2, further comprising the steps of:
receiving at least one, user-designated change to the first model;
updating the first model based on the at least one, user-designated change to generate a changed first model;
receiving at least one, user-designated change to the second model;
updating the second model based on the at least one, user-designated change to generate a changed second model;
generating a third comparison model including a plurality of differences between the changed first model and the changed second model;
displaying the third comparison model with each of the plurality of differences between the changed first model and the changed second model to the user via the display;
receiving a user-request to retrieve the at least one, user-selected difference between the first model and the second model from the memory;
retrieving the at least one, user-selected difference between the first model and the second model from the memory;
determining the one or more differences of the plurality of differences between the changed first model and the changed second model that correspond to one or more differences of the at least one, user-selected difference between the first model and the second model; and
in response to determining the one or more differences of the plurality of differences between the changed first model and the changed second model that correspond to one or more differences of the at least one, user-selected difference between the first model and the second model, and without requiring the user to reselect any of the displayed differences between the first model and the second model, removing from the display each of the one or more differences of the plurality of differences between the changed first model and the changed second model that correspond to one or more differences of the at least one, user-selected difference between the first model and the second model.

6. The method of claim 1, wherein the first comparison model provides an indication of a comparison state for each property in the first and second models, the comparison state indicating whether a property in the first model is equal to or not equal to a property in the second model.

7. The method of claim 1, further comprising:
allowing the user to reselect at least one difference from the displayed plurality of differences between the first model and the second model that has been previously removed from the display;
receiving at least one, user-reselected difference from the user; and
in response to receiving at least one, user-reselected difference from the user, and without changing the first model and the second model, adding to the display the at least one, user-reselected difference to the displayed plurality of differences between the first model and the second model.

8. A non-transitory computer-readable medium having computer-readable instructions stored thereon for execution by a processor to perform a method for filtering a dynamic comparison model comprising:
generating a first comparison model including a plurality of differences between a first model and a second model;
displaying the first comparison model with each of the plurality of differences between the first model and the second model to a user via a display;
allowing the user to select at least one difference between the first model and the second model from the displayed plurality of differences between the first model and the second model;
receiving at least one, user-selected difference between the first model and the second model from the user; and
in response to receiving at least one, user-selected difference between the first model and the second model from the user, and without changing the first model and the second model, removing from the display the at least one, user-selected difference between the first model and the second model from the displayed plurality of differences between the first model and the second model.

9. The non-transitory computer-readable medium of claim 8, wherein the method further comprises saving the at least one, user-selected difference between the first model and the second model in a memory.

10. The non-transitory computer-readable medium of claim 9, wherein the method further comprises:
receiving at least one, user-designated change to the first model;
updating the first model based on the at least one, user-designated change to generate a changed first model;
generating a second comparison model including a plurality of differences between the changed first model and the second model;
displaying the second comparison model with each of the plurality of differences between the changed first model and the second model to the user via the display;
receiving a user-request to retrieve the at least one, user-selected difference between the first model and the second model from the memory;
retrieving the at least one, user-selected difference between the first model and the second model from the memory;
determining the one or more differences of the plurality of differences between the changed first model and the second model that correspond to one or more differences of the at least one, user-selected difference between the first model and the second model; and
in response to determining the one or more differences of the plurality of differences between the changed first model and the second model that correspond to one or more differences of the at least one, user-selected difference between the first model and the second model, and without requiring the user to reselect any of the displayed differences between the first model and the second model, removing from the display each of the one or more differences of the plurality of differences between the changed first model and the second model that correspond to one or more differences of the at least one, user-selected difference between the first model and the second model.

11. The non-transitory computer-readable medium of claim 10, wherein the method further comprises:
 receiving at least one, user-selected difference from the plurality of differences between the changed first model and the second model;
 removing from the display the at least one, user-selected difference between the changed first model and the second model; and
 saving the at least one, user-selected difference between the changed first model and the second model in the memory.

12. The non-transitory computer-readable medium of claim 9, wherein the method further comprises:
 receiving at least one, user-designated change to the first model;
 updating the first model based on the at least one, user-designated change to generate a changed first model;
 receiving at least one, user-designated change to the second model;
 updating the second model based on the at least one, user-designated change to generate a changed second model;
 generating a third comparison model including a plurality of differences between the changed first model and the changed second model;
 displaying the third comparison model with each of the plurality of differences between the changed first model and the changed second model to the user via the display;
 receiving a user-request to retrieve the at least one, user-selected difference between the first model and the second model from the memory;
 retrieving the at least one, user-selected difference between the first model and the second model from the memory;
 determining the one or more differences of the plurality of differences between the changed first model and the changed second model that correspond to one or more differences of the at least one, user-selected difference between the first model and the second model; and
 in response to determining the one or more differences of the plurality of differences between the changed first model and the changed second model that correspond to one or more differences of the at least one, user-selected difference between the first model and the second model, and without requiring the user to reselect any of the displayed differences between the first model and the second model, removing from the display each of the one or more differences of the plurality of differences between the changed first model and the changed second model that correspond to one or more differences of the at least one, user-selected difference between the first model and the second model.

13. The non-transitory computer readable medium of claim 8, wherein the first comparison model provides an indication of a comparison state for each property in the first and second models, the comparison state indicating whether a property in the first model is equal to or not equal to a property in the second model.

14. The non-transitory computer readable medium of claim 8, wherein the method further comprises:
 allowing the user to reselect at least one difference from the displayed plurality of differences between the first model and the second model that has been previously removed from the display;
 receiving at least one, user-reselected difference from the user; and
 in response to receiving at least one, user-reselected difference from the user, and without changing the first model and the second model, adding to the display the at least one, user-reselected difference to the displayed plurality of differences between the first model and the second model.

* * * * *